US008256659B2

(12) United States Patent
Enyedy et al.

(10) Patent No.: US 8,256,659 B2
(45) Date of Patent: Sep. 4, 2012

(54) ENCLOSURE WITH INTEGRAL WIRE REEL SUPPORT (75) Inventors: Edward A. Enyedy, Eastlake, OH (US); Kenneth Justice, Wickliffe, OH (US); Michael Kindig, Chagrin Falls, OH (US); Jason Leach, Cleveland Heights, OH (US); Luke Petrila, Westlake, OH (US)

(73) Assignee: Lincoln Global, Inc., City of Industry, CA (US)

( * ) Notice: Subject to any disclaimer, the term of this patent is extended or adjusted under 35 U.S.C. 154(b) by 247 days.

(21) Appl. No.: 12/645,449

(22) Filed: Dec. 22, 2009

(65) Prior Publication Data
US 2011/0147250 A1    Jun. 23, 2011

(51) Int. Cl.
*B23K 1/00* (2006.01)
(52) U.S. Cl. .......................... 228/41; 219/136
(58) Field of Classification Search .................. 228/41; 219/136
See application file for complete search history.

(56) References Cited

U.S. PATENT DOCUMENTS

| | | |
|---|---|---|
| 1,421,449 A | 7/1922 | Gamage |
| 3,691,639 A | 9/1972 | Roeseler et al. |
| 3,815,843 A | 6/1974 | Fortune |
| 4,903,913 A | 2/1990 | McCaffrey |
| 5,137,223 A | 8/1992 | Brandon et al. |
| 5,499,727 A | 3/1996 | Koch |
| 5,690,198 A | 11/1997 | Lohr |
| 5,701,981 A | 12/1997 | Marshall et al. |
| 6,064,036 A | 5/2000 | Kensrue |
| 6,170,775 B1 | 1/2001 | Kovacik et al. |
| 6,479,795 B1 | 11/2002 | Albrecht et al. |
| 6,568,578 B1 | 5/2003 | Kensrue |
| 6,702,608 B2 | 3/2004 | Brennan, Jr. |
| 2004/0200819 A1 | 10/2004 | Kensrue |
| 2005/0258155 A1 | 11/2005 | Deyoung |
| 2006/0207981 A1 | 9/2006 | Diekmann et al. |
| 2009/0166345 A1 | 7/2009 | Enyedy et al. |

OTHER PUBLICATIONS

Search report for application PCT/IB2010/003275 dated May 27, 2011.
Written Opinion for application PCT/IB2010/003275 dated May 27, 2011.
SuitCase 8VS Owner's Manual, Miller Electric Mfg. Co., Nov. 2005, 32 pgs., Appleton, WI.
SuitCase X-Treme 12VS Owner's Manual, Miller Electric Mfg. Co., Sep. 2007, 44 pgs., Appleton, WI.
Power MIG 255XT Specification, The Lincoln Electric Company, Jul. 2008, 8 pgs., Cleveland, OH.
Power MIG 255 Specification, The Lincoln Electric Company, Nov. 2003, 8 pgs., Cleveland, OH.
LN-25 PRO Specification, The Lincoln Electric Company, Jan. 2009, 4 pgs., Cleveland, OH. LN-25 Wire Feeder, The Lincoln Electric Company, Nov. 2003, 8 pgs., Cleveland, OH.

*Primary Examiner* — Nicholas D'Aniello
(74) *Attorney, Agent, or Firm* — Hahn Loeser & Parks LLP (57) ABSTRACT Embodiments of the present invention include a welding wire feeder enclosure, the enclosure including a front, a rear, a top, and a bottom forming a perimeter of the enclosure. The enclosure further includes opposing side openings separated by a width of the enclosure, each of the side openings being adapted for receiving a side panel. Particular embodiments further include a divider panel extending substantially between the front, rear, top, and bottom, and positioned along an intermediate portion of the width of the enclosure to divide an internal volume of the enclosure into a service side and a user side, the divider panel being formed monolithically with the front, rear, top, and bottom of the enclosure, the divider panel further including an integral spindle shaft location.

20 Claims, 9 Drawing Sheets

ENCLOSURE WITH INTEGRAL WIRE REEL SUPPORT

BACKGROUND OF THE INVENTION

1. Field of the Invention

This invention relates generally to enclosures for retaining welding wire reels. Such enclosures may comprise, without limitation, a welding wire feeder, or a welding unit also including a welding wire reel.

2. Description of the Related Art

Wire feeders, like those used in arc welding applications, convey wire from a continuous feed source to a weld torch. In many instances, the wire is fed from a reel or drum rotationally attached to a spindle. The spindle is attached to a mast, which supports the spindle and the weight of any reel attached thereto.

SUMMARY OF THE INVENTION

Particular embodiments of the present invention include apparatus for enclosing and housing a welding wire feeder, and in particular embodiments a welding wire feeder and a welder. Embodiments of the present invention include a welding wire feeder enclosure, the enclosure including a front, a rear, a top, and a bottom forming a perimeter of the enclosure. The enclosure further includes opposing side openings separated by a width of the enclosure, each of the side openings being adapted for receiving a side panel. Particular embodiments of the enclosure further include a divider panel extending substantially between the front, rear, top, and bottom, and positioned along an intermediate portion of the width of the enclosure to divide an internal volume of the enclosure into a service side and a user side, the divider panel being formed monolithically with the front, rear, top, and bottom of the enclosure, the divider panel further including an integral spindle shaft location.

DETAILED DESCRIPTION OF PARTICULAR EMBODIMENTS

Particular embodiments of the present invention provide enclosures for housing a welding wire feeder, which may also include a welding unit. The enclosures include panels (or walls), which may include an integral wire reel support shaft or strengthening member, where said panels may also be integral with said enclosures. In particular embodiments, particular components of the panel may be formed monolithically with the panel, while the panel may be formed monolithically with portions of the enclosure.

Figure 1:
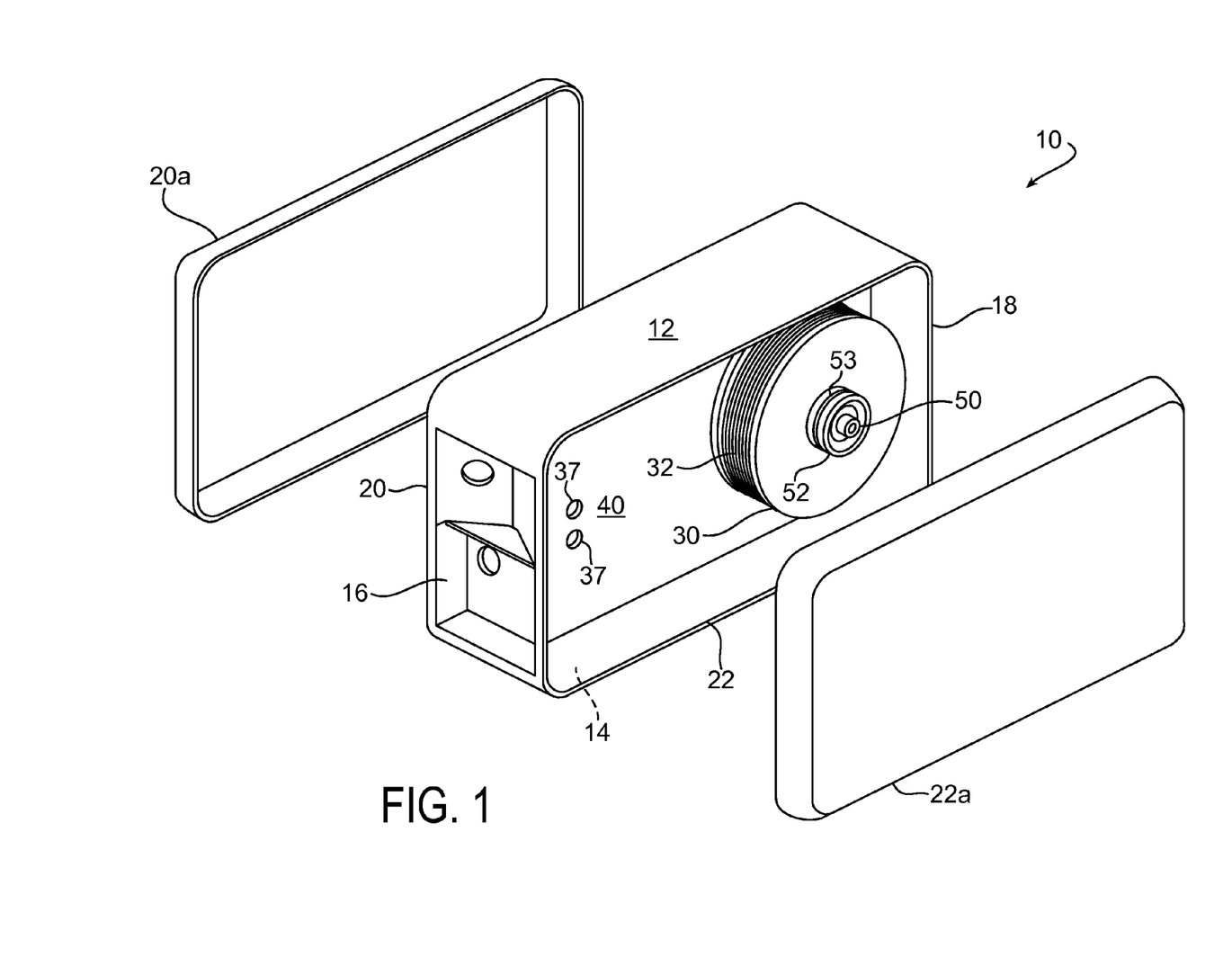
FIG. 1 is a perspective exploded side view of a welding wire feeder enclosure being monolithically formed with a divider panel, according to one embodiment of the invention.
Figure 11:
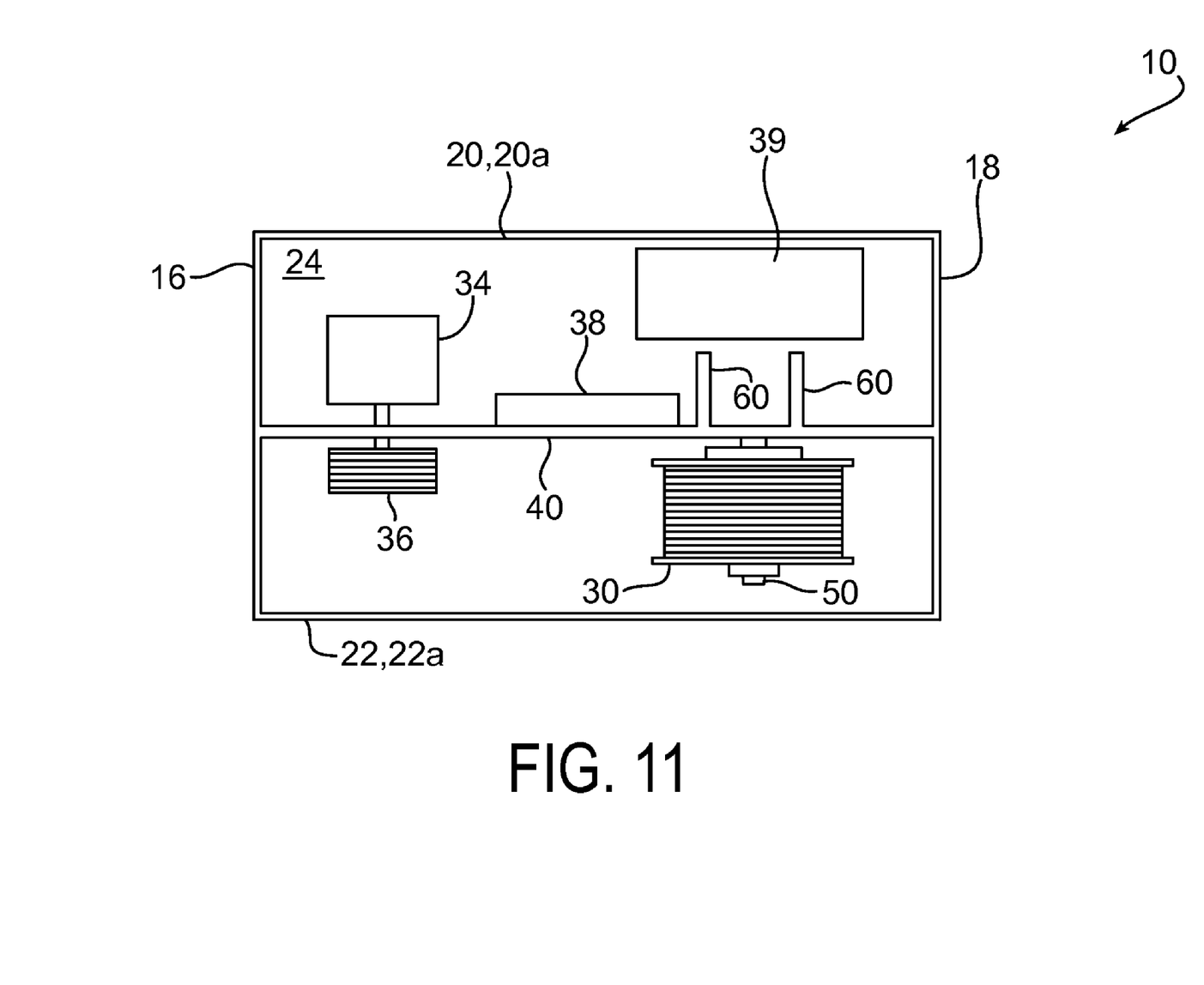
FIG. 11 is a top view of a welding wire feeder enclosure that also houses a welding unit to form a combination welder/wire feeder according to a particular embodiment of the present invention.

With reference to FIG. 1, an enclosure 10 for housing welding wire generally includes a divider panel 40 formed monolithically with a top 12 and bottom 14, and a front 16 and rear 18 of the enclosure. The enclosure further includes an integral spindle shaft 50 extending from a spindle shaft location 49 (shown in FIGS. 4-9) along the panel 40. The spindle shaft 50 is provided for mounting a welding wire reel or spool 30 thereon. With general reference to FIGS. 2-3, enclosure 10 may also include a spindle shaft strengthening member 60, which provides additional support to the panel when a wire reel 30 is operable mounted upon the spindle shaft 50. By stating that the panel, or any other component, is monolithic or monolithically formed, it is meant that the panel or component is formed of a single, continuous piece from one or more materials. Monolithic formation provides improved strength for enclosure 10, such as when retaining a welding wire reel 30 therein, and reduces labor and inventory for assembling enclosure 10. Enclosure 10 comprises a housing for a welding wire feeder, and in particular embodiments, the welding wire feeder enclosure is further adapted to house a welding unit 39, which is exemplarily shown in FIG. 11.

Figure 2:
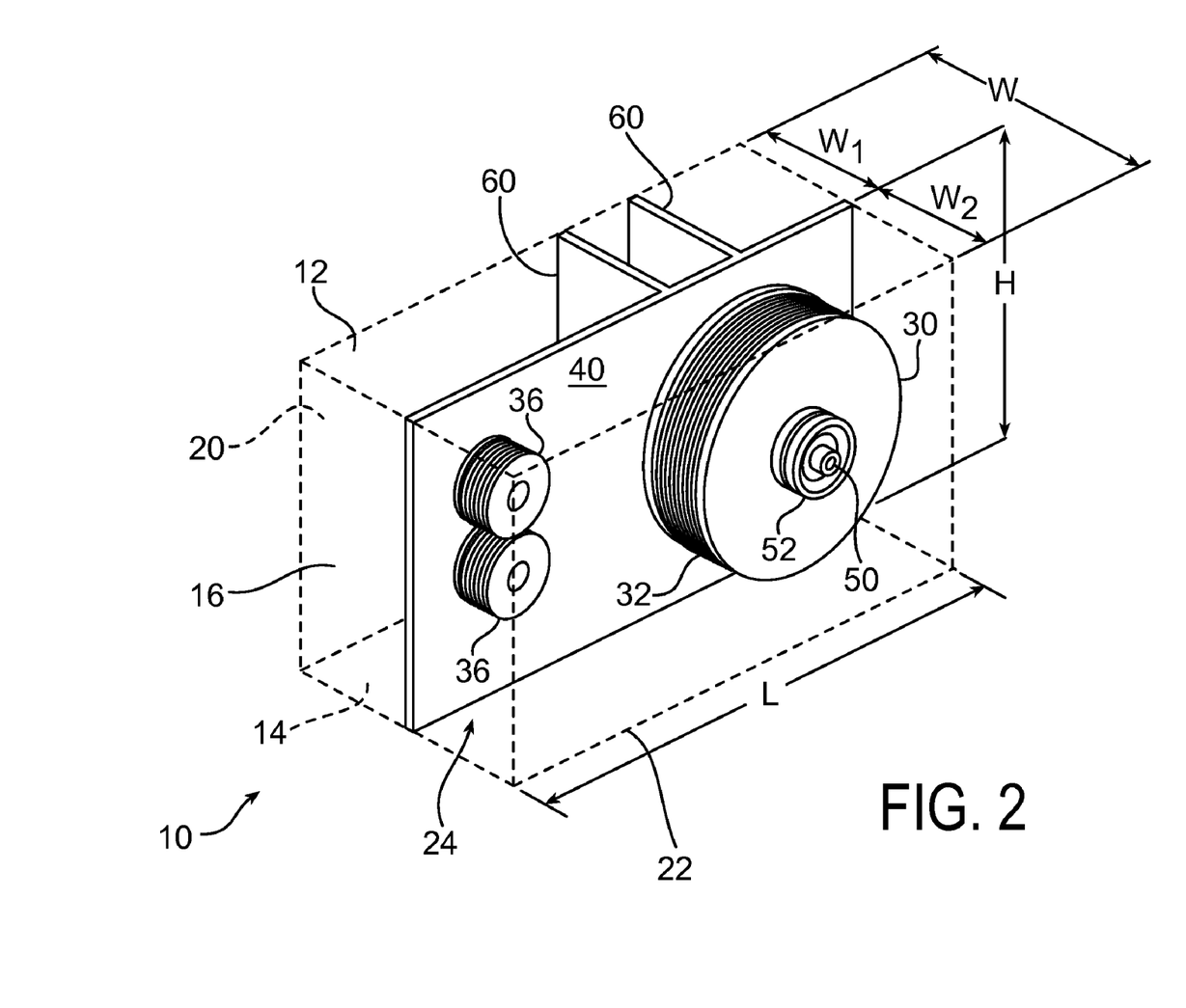
FIG. 2 is a perspective side view of an enclosure for a welding wire feeder, according to one embodiment of the invention, wherein the top, bottom, front, rear, and opposing sides are shown in hidden view to better expose the divider panel and other extents of an internal volume of the enclosure.
Figure 3:
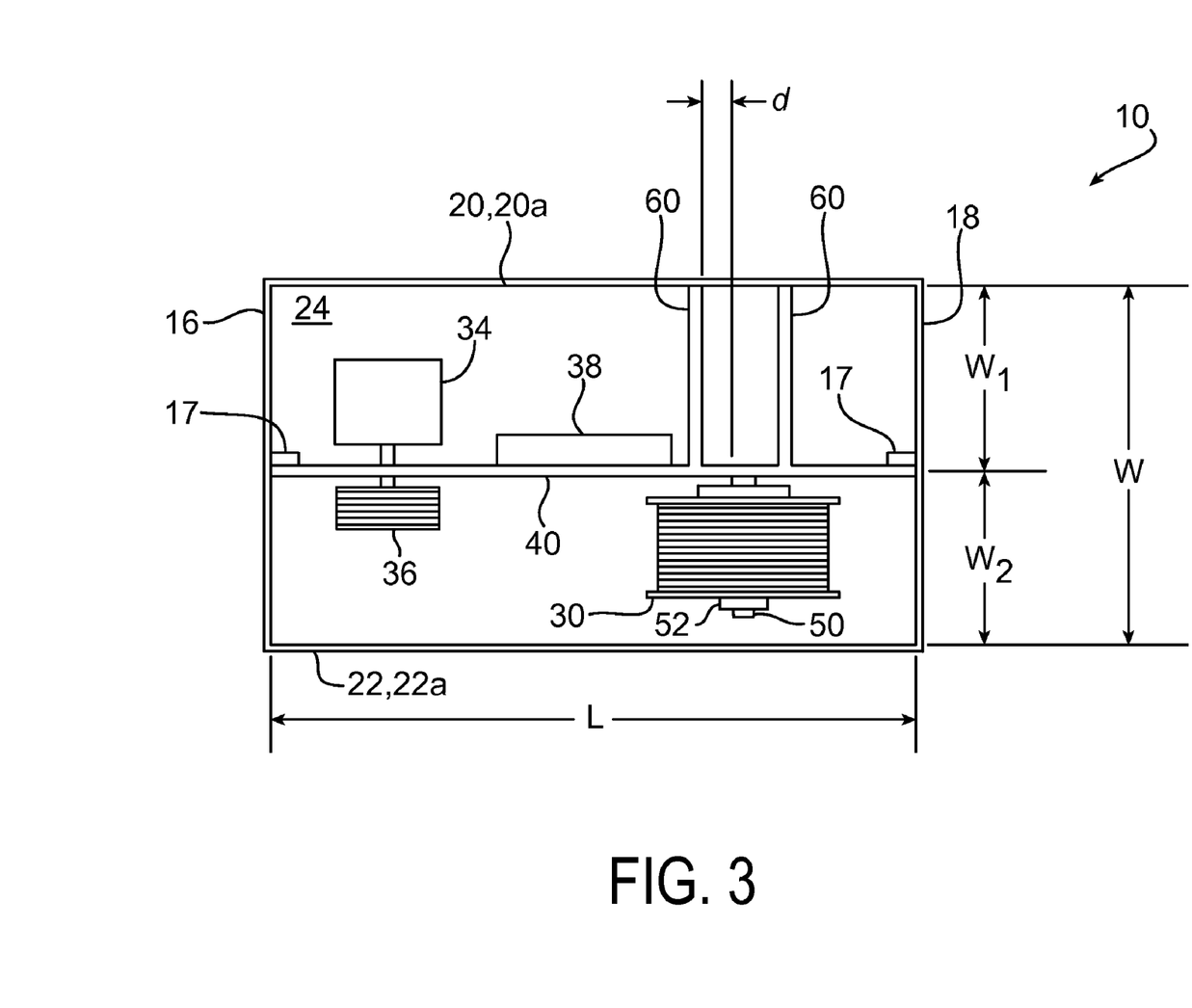
FIG. 3 is a top view of the enclosure shown in FIG. 2, except that the panel is shown integrally mounted within the enclosure.
Figure 4:
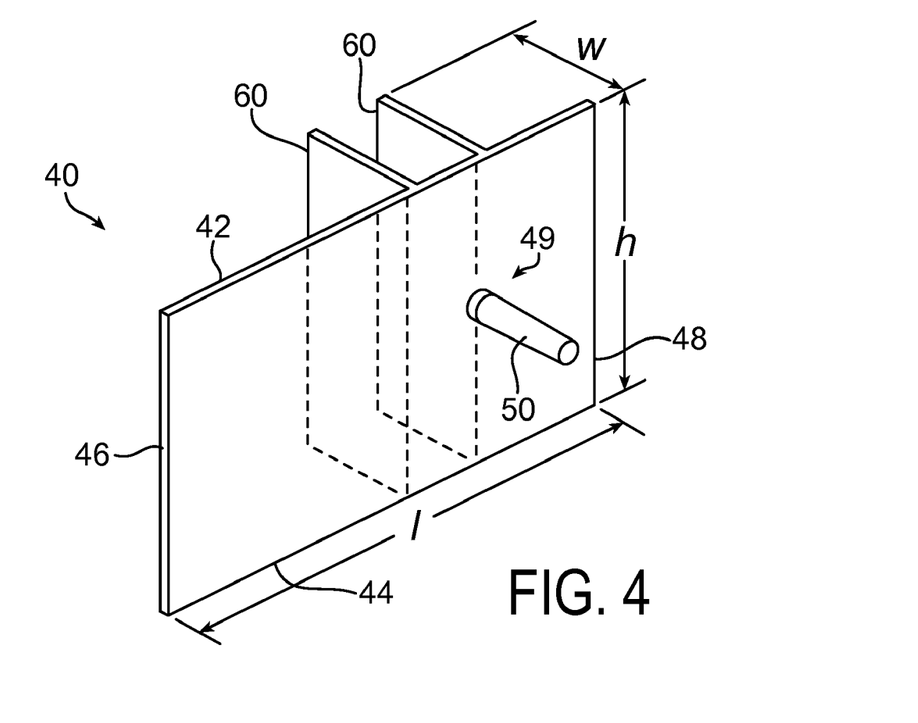
FIG. 4 is a perspective side view of the divider panel shown in FIG. 2.
Figure 5:
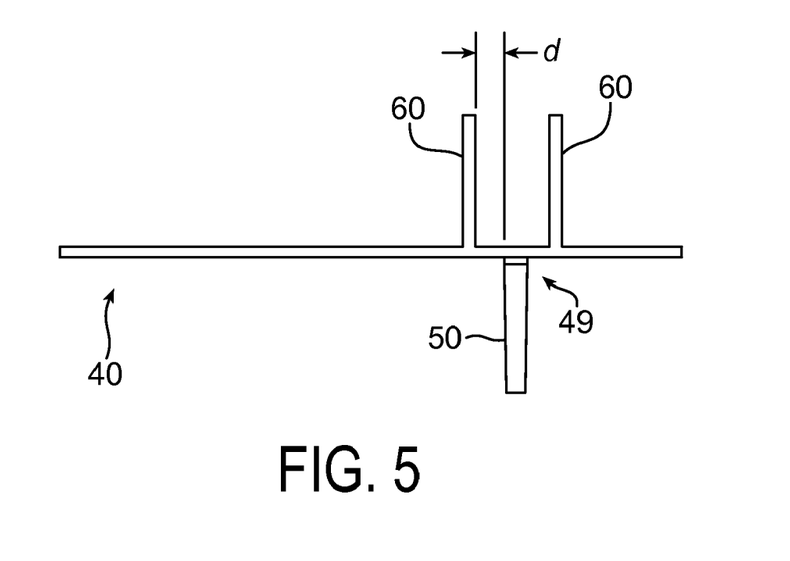
FIG. 5 is a top view of the divider panel shown in FIG. 2.

With continued reference to FIGS. 2-3, the top 12, bottom 14, front 16, and rear 18 form a perimeter about the enclosure, while opposing sides 20, 22 include openings generally separated by a width W of the enclosure, each of the side openings being adapted for receiving a side panel 20a, 22a, respectively. The top 12, bottom 14, front 16, and rear 18 with opposing sides 20, 22 generally form or define an interior volume (or chamber) 24 of the enclosure 10. The interior volume 24, having a length L, a height H, and a width W, is adapted to receive a welding wire reel 30, which retains welding wire 32 for ultimate disposition from enclosure 10 during a welding operation. Interior chamber 24 may also include one or more motors 34 to drive one or more wheels or rollers 36 for dispensing welding wire 32 from reel 30. One or more apertures 37 are positioned within panel 40, whereby a shaft extends from a corresponding roller 36 for communication with a motor 34. It is understood that one or more of the rollers 36 may be rotationally fixed, where each associated shaft may be attached to panel 40 or extend there through. In the embodiment shown, wire 32 from reel 30 is generally positioned between the rollers 36, which control and drive the dispensing of the wire from reel 30. A controller or microprocessor 38 for controlling the wire feeder and/or welding unit 39, as well as any other desired component or apparatus, may also be contained within enclosure 10 as desired. When the enclosure is a combination welding wire feeder/welder, as discussed above with reference to FIG. 11, the enclosure also includes a welding unit 39, which may include a transformer or the like to facilitate a welding operation.

The interior volume 24 may be partitioned by a divider panel (or wall) 40. For example, in FIGS. 1-3, the divider panel partitions the interior volume 24 into a service side associated with side 20 and having a width $W_1$, and a user side associated with side 22 and having a width $W_2$. With general reference to FIG. 4, any divider panel 40 generally includes a length l generally extending longitudinally between the front 16 and rear 18, and a height h generally extending vertically between the top 12 and bottom 14 of enclosure 10. While divider panel 40 may comprise any size relative to interior volume 24, in particular embodiments, panel length l may be substantially equal to or less than volume length L, and divider height h may be substantially equal to or less than volume height H. In extending generally between the front 16 and rear 18, it is understood that front and/or rear edges 46, 48 of panel 40 may engage one or more front and/or rear extensions 17, or otherwise be offset from the front 16 and/or rear 18. Likewise, in extending generally between the top 12 and bottom 14, it is understood that top and/or bottom edges 42, 44 of panel 40 may engage a top and/or bottom extension (not shown, but similar to the front and/or rear extension 17 discussed above), respectively, or otherwise be offset from the top 12 and/or bottom 14. Divider panel 40 is also laterally positioned between opposing side openings, that is, in other words, along an intermediate portion of the width W, such as shown in FIGS. 1-3, for example, where the intermediate portion comprises the lateral mid-point of the width W and any other position along width W between sides 20, 22, such that the divider panel 40 divides interior volume 24 into a user side and a service side. Various divider panels 40 are generally shown in FIGS. 4-9 without enclosure 10 for ease of viewing, as it is understood that each such panel 40 may be integrally secured or attached within enclosure 10, or monolithically formed with enclosure 10.

As generally shown in the FIG. 4-7, divider panel 40 is monolithically formed of one or more materials with a spindle shaft 50 and one or more strengthening members 60. In other variations, divider panel 40 is monolithically formed with either the spindle shaft 50 or one or more strengthening members 60. When the spindle shaft 50 is monolithically formed with panel 50, the spindle shaft 50 extends from a spindle shaft location 49 of the panel. It is understood that in other embodiments, however, any of the spindle shaft 50 and one or more strengthening member 60 may be separately formed and integrally attached to panel 40 by any known means, such as by use of fasteners, adhesives, or welding, for example. For example, as shown by example in FIG. 8, the panel 40 is adapted to receive a spindle shaft 50 in a spindle shaft location 49, where the spindle shaft location 49 includes one or more apertures 70 for attaching the spindle shaft 50 to panel 40 by way of fasteners.

Panel 40 may also be monolithically formed with other components of enclosure 10. For example, divider panel 40 may be monolithically formed with the top 12, bottom 14, front 16, and rear 18 as shown in an exemplary configuration in FIG. 1. In other embodiments, divider panel 40 may be monolithically formed with any one or more of the top 12, bottom 14, front 16, and rear 18. A panel 40 monolithically formed with top 12, bottom 14, front 16, and/or rear 18 may or may not include a spindle shaft 50 or one or more strengthening members 60 also formed monolithically with panel 40. Monolithic formation of divider panel 40 and/or enclosure 10 is achieved by any known molding process. In other variations, panel 40 may be formed separately from top 12, bottom 14, front 16, and/or rear 18 portions and integrally installed within enclosure 10 by use of any fasteners, adhesives, welding, mechanical interference, or any other means known to one having ordinary skill in the art. One or more extensions 17 may extend relative to any edge of panel 40 from any portion of enclosure 10 to assist in installing divider panel 40, which are shown generally in FIG. 3.

With reference to FIGS. 1-2, each side 20, 22 may also include, or form, a separable side panel or wall 20a, 22a, respectively. As with divider panel 40, each side panel or wall 20a, 22a generally includes a length extending longitudinally between the front 16 and rear 18, and a height extending vertically between the top 12 and bottom 14 of enclosure 10. Any side panel 20a, 22a may be fixedly or pivotably attached to enclosure 10, such as being hinged along a top, side, or bottom edge, for example, to enclosure 10 for providing access to interior volume 24. In the embodiment shown, side panel 20a provides access to a service side of the interior volume, while side panel 22a provides access to a user side of the interior volume.

According to an aspect of this invention, each enclosure 10 includes a spindle shaft 50 that is integral with any panel or wall of enclosure 10. In the embodiments shown in FIGS. 4-7, divider panel 40 includes an integral spindle shaft 50 monolithically formed with panel 40, whereby the spindle shaft extends from a spindle shaft location 49 along panel 40. An integral shaft 50 may be formed separately from panel 40 and attached to a panel 40 as suggested above. As also suggested above, it is understood that any side panel 20a, 22a may instead include an integral spindle shaft 50 that is formed separately and attached by any known means in a spindle shaft location 49 along such panel 20a, 22a. Spindle shaft 50 comprises a generally cylindrical body extension 51a, where the generally cylindrical shaft may be cylindrical or slightly tapered to form a frusto-conical extension (i.e., having the frustum of a cone). It is understood that the shaft 50 may be hollow or solid.

Figure 10:
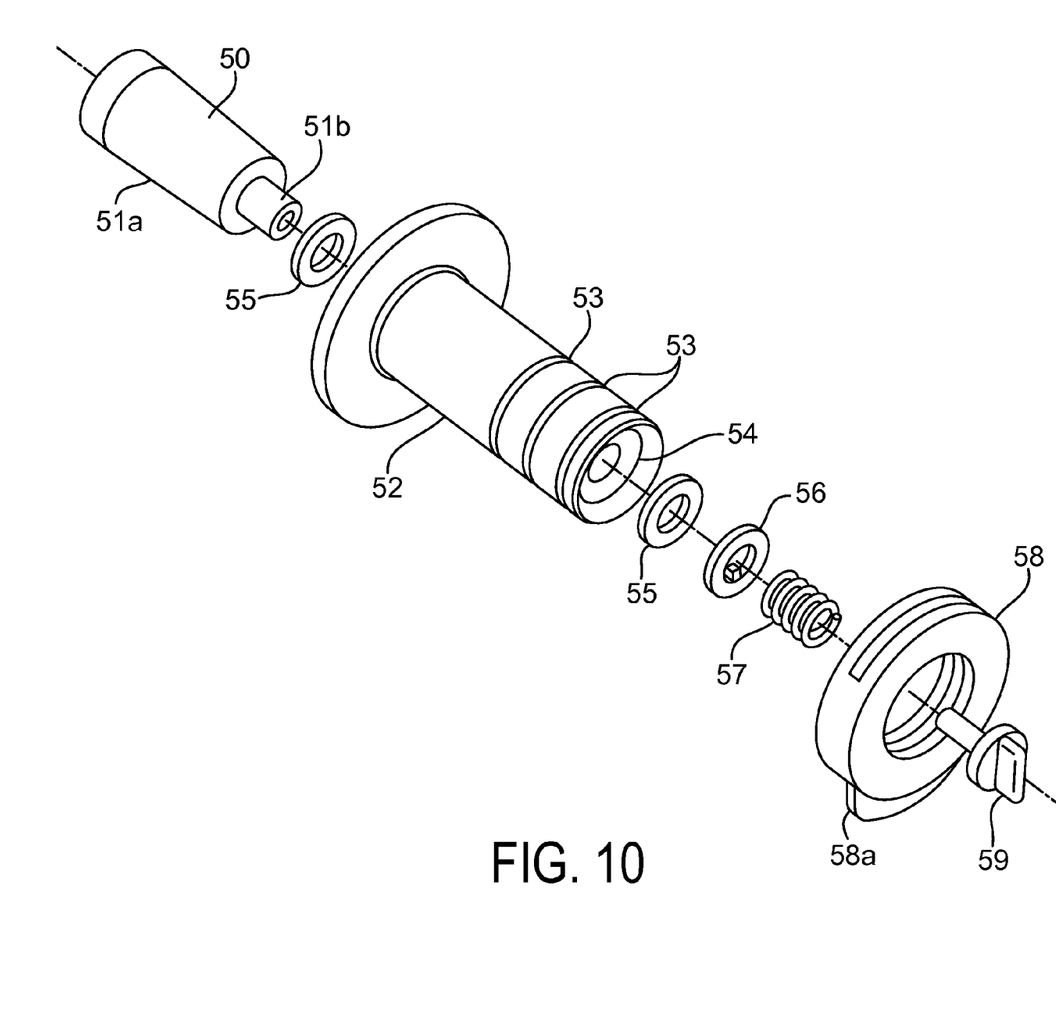
FIG. 10 is a perspective exploded view of an exemplary spindle rotating assembly, according to one embodiment of the present invention.

The welding wire reel 30 may rest directly on the shaft 50, or a rotating assembly may be positioned between the reel 30 and shaft 50, which may be operably secured to either the shaft (as exemplarily shown in FIG. 10) or the reel 30. By way of example, an exemplary rotating assembly is shown in FIG. 10. The assembly includes a rotating spindle sleeve 52 having a central bore extending axially (i.e., longitudinally) there through for receiving shaft 50. One or more bearings may be located along the central bore of sleeve 52 for improved rotation. Sleeve 52 may also include a reduction or step 54 located within the central bore, which abuts shaft end 51b for the purpose of facilitating the retention of sleeve 52 upon shaft 50. Reduction or step 54 may form an intermediate wall of the central bore. Shaft end 51b is shown to comprise a reduced section or diameter of shaft 50 relative to body extension 51a; however, in other variations, the end 51b may be similarly sized, or a continuation of body 51a. Friction facilitating members 55 may be positioned on either side of bore step 54 to improve the braking capabilities of sleeve 52 when rotation is no longer desired (i.e., when wire feeding ceases). Friction members 55 may comprise, for example, cork washers. A protective member 56, such as a metallic or plastic washer, may then be positioned between the outermost member 55 and a spring 57. Spring 57 applies additional force to the attachment of sleeve 52 upon shaft 50 for the purpose of further preventing the rotation of sleeve 52 when any wire feeding force (i.e., any rotational drive force) is no longer applied to the spindle sleeve 52. A threaded fastener 59 extending through the central bore and an aperture in step 54 secures sleeve 52 upon shaft 50, while also retaining spring 57 is a compressed arrangement. By further tightening or loosening fastener 59, the spring force can be adjusted to further control the braking capabilities of the assembly. A collar 58 secured along the outer surface of sleeve 52 retains any wire reel 30 upon sleeve 52. In the variation shown, a tab 58a, which may be spring loaded, extends from collar 58 to releasably engage any groove 53 positioned along the outer surface of sleeve 52.

In other embodiments, it is also understood that the rotating assembly may simply comprise one or more bearings or bushings disposed between any of the shaft 50, sleeve 52, and reel 30, whereby such one or more bearings or bushings may be secured to any of the shaft 50, sleeve 52, or reel 30. As suggested above, a rotating assembly may not be provided, as reel 30 may simply rotate along shaft 50 or a stationary protective sleeve 52. In any embodiment discussed above, any means of retaining reel 30 along shaft 50 or sleeve 52 may be employed, which may comprise, without limitation, any fastener, pin, or collar. For example, one or more apertures (not shown) may be provided for receiving a pin, fastener, or other device for retaining a welding wire reel 30 upon the shaft 50 or sleeve 52. In other examples, the end of spindle shaft 50 or sleeve 52 may be threaded to receive a collar or other device for retaining spool 30 upon spindle shaft 50.

According to another an aspect of this invention, enclosure 10 includes one or more integral strengthening members 60 extending from a panel also containing an integral spindle shaft 50. Strengthening members 60 extend outwardly from a side of any divider or side panel to further strengthen the corresponding panel and to resist the forces generated by mounting a wire spool 30 upon spindle shaft 50. To achieve its purpose, strengthening members 60 are positioned in close proximity to, or, in other words, adjacent to, the integral spindle shaft 50 or the spindle shaft location 49, from which a spindle shaft 50 is intended to extend from. In being adjacent to the spindle shaft location 49 or to the spindle shaft 50, a strengthening member 60 may be aligned with, or offset a distance d from, the spindle shaft location 49 or spindle shaft 50. For example, the pair of strengthening members 60 shown in FIGS. 2-5 are arranged adjacent to spindle shaft location 49 and spindle shaft 50, whereby members 60 extend an offset distance d from the spindle shaft location 49 and spindle shaft 50. In other words, the adjacently positioned strengthening members 60 are offset a distance d from a plane extending substantially parallel to a longitudinal side of spindle shaft 50, as shown in FIGS. 2-5, whereby such plane may also extend substantially perpendicular to a panel side surface as also shown. By further example, the strengthening members 60 shown in FIGS. 6-9 extend in adjacent relation to the spindle shaft location 49 and spindle shaft 50, whereby the strengthening members 60 each are aligned with the spindle shaft location 49 and spindle shaft 50. Offset distance d may comprise a distance one inch (1") or less, two inches (2") or less, or three inches (3") or less. Of course, offset distance d may comprise any desired distance suitable for any particular application to sufficiently function to strengthen panel 40 to support a reel 30 when mounted on shaft 50. Therefore, greater offset distances d may be employed while still remaining adjacent to the spindle shaft location 49 or spindle shaft 50 in larger enclosures.

Regardless of whether a strengthening member 60 is offset from or aligned with the spindle shaft location and spindle shaft 50, it is further understood that strengthening members 60 may be adjacently positioned relative to the spindle shaft location 49 or spindle shaft 50 when the strengthening member 60 is positioned on the same side or side surface of panel 40 as is the spindle shaft location 49 or spindle shaft 50, such as is shown by way of example in FIGS. 6-9, or when positioned along a side or side surface of panel 40 opposite the side or side surface along which the spindle shaft location or spindle shaft 50 is positioned, such as is shown by example in FIGS. 2-5. With reference to FIGS. 6-9, it is further described that the spindle shaft location 49 and/or spindle shaft 50 may be adjacently located along any one or more strengthening members 60.

Figure 6:
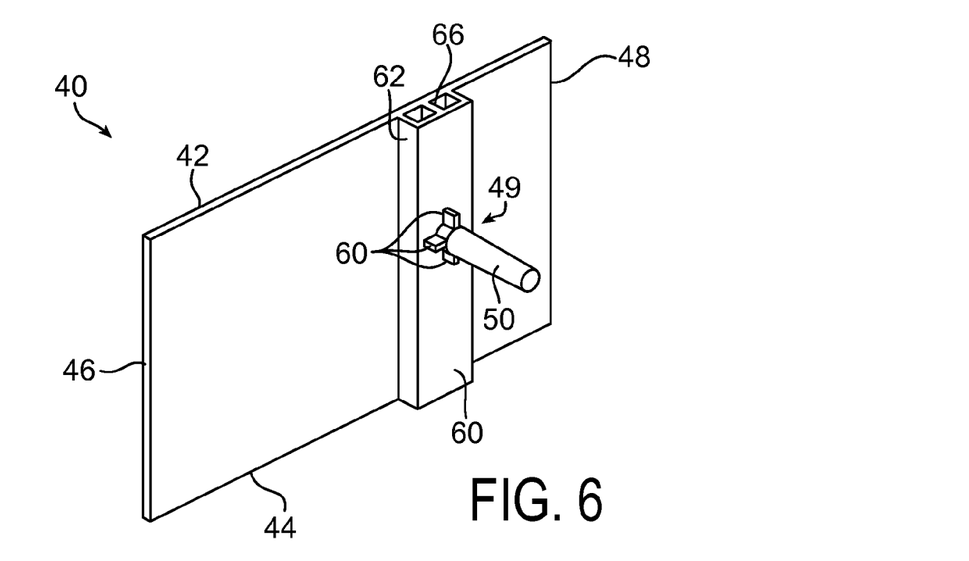
FIG. 6 is a perspective side view of an alternative divider panel of the enclosure shown in FIG. 2, according to an embodiment of the invention.
Figure 7:
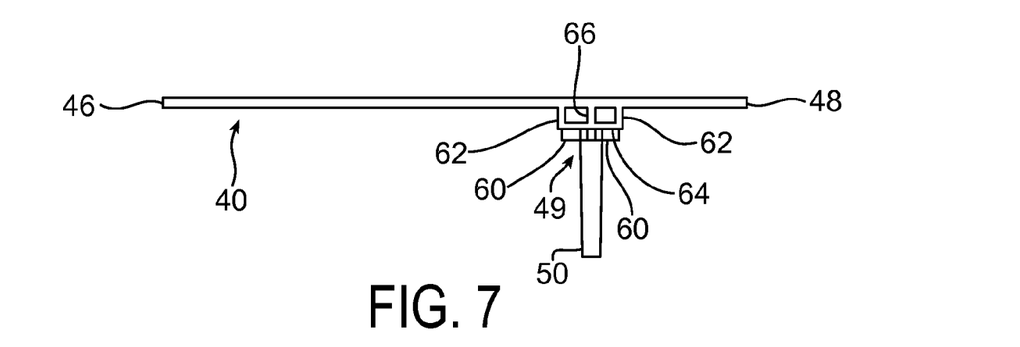
FIG. 7 is a top view of a variation of the alternative divider panel shown in FIG. 6.

In the embodiments shown, strengthening members 60 generally extend outwardly and vertically from any side of a panel or wall. For example, strengthening members 60 may extend in a straight vertical line or within a plane, such as is generally shown in FIGS. 2-5. By further example, generally vertically extending strengthening members 60 may also extend vertically without extending in a straight line or within a plane. In other words, such members 60 may extend vertically in a curvilinear, zig-zag, or other non-linear path. In fact, a non-linear path may decrease the severity of any stress concentrations associated with a linear path, while also increasing the strength and efficiency of strengthening members 60 by increasing the section modulus thereof. With reference to FIGS. 6-7, which include a strengthening member 60 extending vertically along the height h as well as strengthening members 60 extending about shaft 50 less than the height h or length l of panel 40. The members 60 extending around shaft 50 exemplify that any strengthening member 60 may also extend in a longitudinal direction along the length l of panel 40, or any other direction between vertical and longitudinal.

Strengthening members 60 generally extend vertically along a side of any panel 40. It is understood that members 60 may extend any distance along the height h of any panel, and in particular embodiments, members 60 extend substantially the full height h as generally shown in FIGS. 2-9. For improved strength and rigidity, regardless of how far a member 60 extends along height h, it can be beneficial for a strengthening member 60 to extend from the bottom of the associated panel, so that the bottom of the strengthening member 60 is adjacent to the bottom of the enclosure, whereby the strengthening member 60 rests against, and thereby gains support from, a base structure, such as the enclosure bottom 14, for example, as generally shown in FIGS. 2-3.

For further improvements in strength and rigidity, members 60 may extend between a side panel 20a, 22a and a divider panel 40. This is generally shown in FIGS. 2-3, where members 60 extend a distance w, which is substantially equal to a width $W_1$ of a first partitioned interior volume. While the members 60 are shown to extend from divider panel 40, it is contemplated that strengthening members 60 may instead extend from, and be integral with, any side panel 20a, 22a to ultimately engage divider panel 40 in area of close proximity or adjacent to spindle shaft 50. In lieu of extending the full width $W_1$ or $W_2$ of any partitioned volume, it is understood that any strengthening member 60 may extend any distance less than the full width $W_1$ or $W_2$ as desired, such as is exemplarily shown in FIGS. 6-9.

Figure 8:
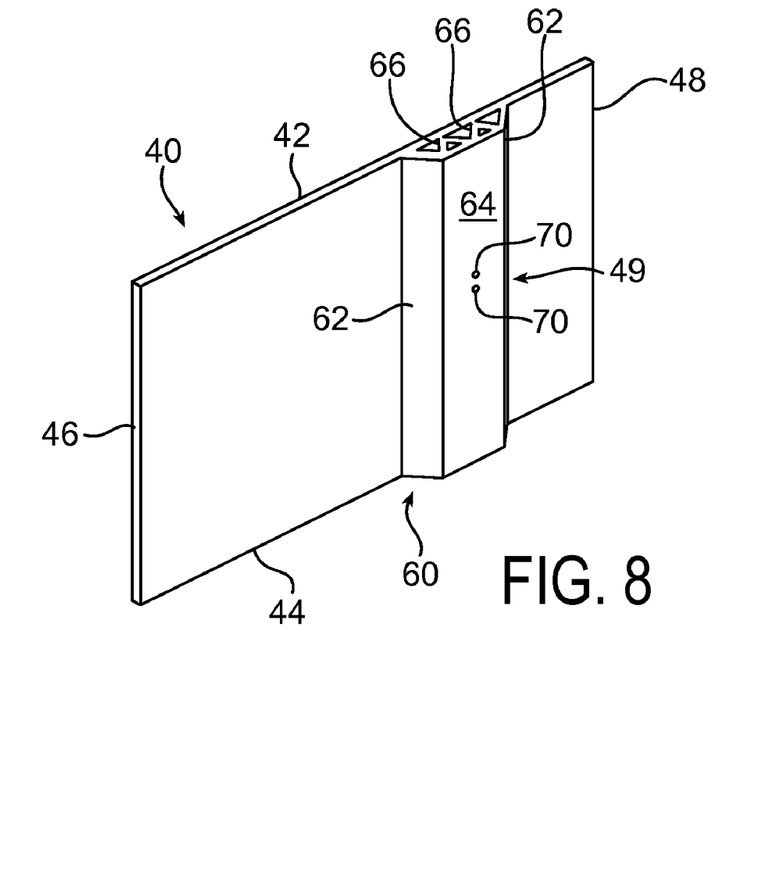
FIG. 8 is a perspective side view of another alternative divider panel of the enclosure shown in FIG. 2, according to an embodiment of the invention.
Figure 9:
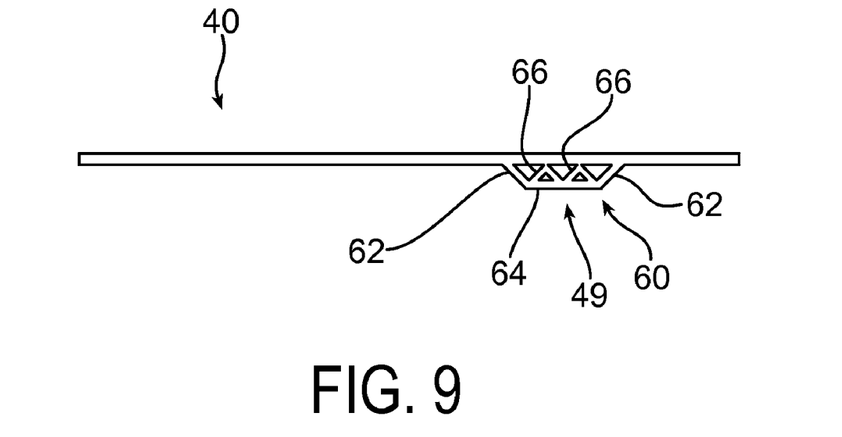
FIG. 9 is a top view of a variation of the alternative divider panel shown in FIG. 8.
Figure 12:
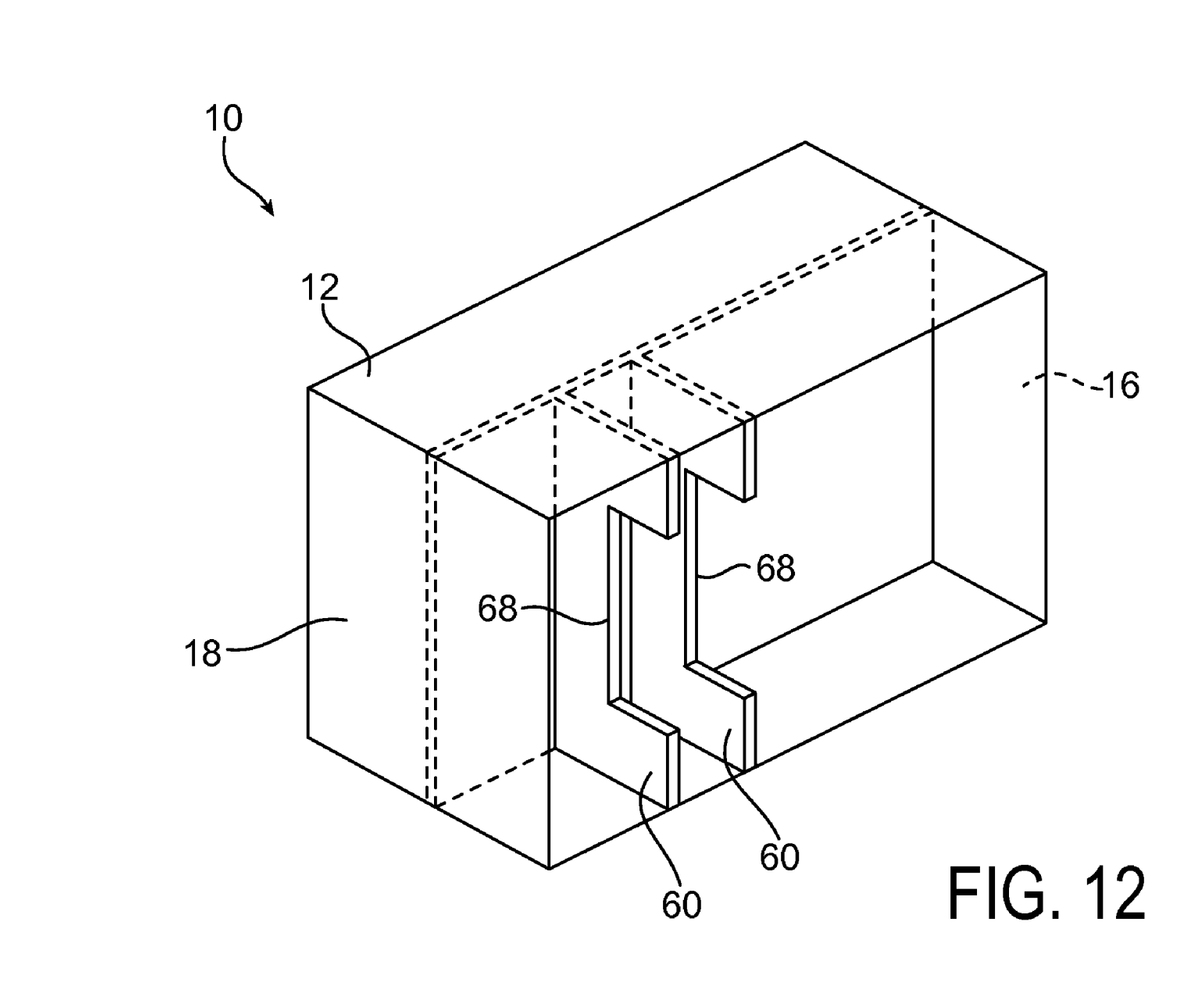
FIG. 12 is a perspective side view of the combination welder/welding wire feeder enclosure shown in FIG. 11.

It is understood that a strengthening member 60 may comprise any of a variety of configurations or structures. For example, with reference to FIGS. 2-5, a pair of members 60 comprise planar extensions protruding in parallel relation and perpendicularly from a side of panel 40. It is understood that one or more of such members 60 may be employed on any panel. By further example, with reference to FIG. 4, strengthening member 60 comprises a vertically extending box or channel, whereby opposing sidewalls 62 are connected by a cross-member 64. In the embodiment shown, spindle shaft 50 extends from the cross-member 64; however, in other arrangements, such a strengthening member 60 may extend from a panel side opposite to spindle shaft 50. Cross-member 64 may extend from the ends of sidewalls 62 as exemplarily shown, or from any intermediate portion thereof. Further, one or more intermediate members 66 may extend at any angle or bias within any strengthening member 60, whether extending between the panel 40 and the cross-member 64, such as is generally shown in FIGS. 7-9, or between sidewalls 62 (not shown). In FIGS. 7-8, the intermediate members 66 extend orthogonally from panel 40, while members 66 extend at any other angle not perpendicular to panel 40. It is understood that sidewalls 62 may also extend at any relative angle or bias, whether being perpendicular to an associated panel, such as is generally shown in FIGS. 6-7, or at any other angle, such as is shown generally in FIGS. 8-9. It is also understood that any strengthening member 60 may include one or more recesses 68 to reduce the weight of enclosure 10 or for receiving a component or providing clearance for a component of the enclosure 10, for example. With reference to FIG. 12, exemplary recesses 68 are provided in each strengthening member 60 to provide sufficient space for a welding unit 39. In any variation, the recess may be positioned along any portion of any length, height, or width of a strengthening member 60, or of panel 40.

Any panel 40 may be made from any desired material, such as, for example, any plastic or metal, and manufactured by any means known to one of ordinary skill in the art. Exemplary plastics include polycarbonate (PC), a polycarbonate/acrylontitrile-butadiene styrene blend (PC/ABS), polycarbonate/polybutylene terephthalate blend (PC/PBT), and a polyester blend. When any such panel is made of plastic, the panel may be formed by any desired molding process. When any such panel is made of metal, the panel may be formed by any molding or fabrication process. The spindle shaft 50 and/or any strengthening members 60 may be permanently or removably attached to an associated panel to form an integral spindle and/or integral strengthening members 60. In such embodiments, attachment may be achieved by use of welding, adhesives, fasteners, or any other means known to one of ordinary skill in the art. It is also understood that a spindle shaft 50 and/or any strengthening members 60 may be formed monolithically with any associated panel, such as by a molding process for example. Any spindle shaft 50 and/or strengthening member 60 may be hollow or solid in cross-section.

While this invention has been described with reference to particular embodiments thereof, it shall be understood that such description is by way of illustration and not by way of limitation. Accordingly, the scope and content of the invention are to be defined only by the terms of the appended claims.

What is claimed is:

1. A welding wire feeder enclosure, the enclosure comprising:
   a front, a rear, a top, and a bottom forming a perimeter of the enclosure;
   opposing side openings separated by a width of the enclosure, each of the side openings being adapted for receiving a side panel;
   a divider panel extending substantially between the front, rear, top, and bottom, and positioned along an intermediate portion of the width of the enclosure to divide an internal volume of the enclosure into a service side and a user side, the divider panel being formed monolithically with the front, rear, top, and bottom of the enclosure, the divider panel further including an integral spindle shaft location, and one or more integral strengthening members extending outwardly from a side surface of the divider panel opposite the integral spindle shaft location.

2. The enclosure of claim 1, wherein the one or more strengthening members are positioned adjacent the spindle shaft location.

3. The enclosure of claim 1, wherein the one or more strengthening members extend a partial width of one of the service or user side of the enclosure.

4. The enclosure of claim 1, wherein the one or more strengthening members are monolithically formed with the divider panel.

5. The enclosure of claim 1, further comprising an integral spindle extending from the spindle shaft location.

6. The enclosure of claim 5, wherein a spindle shaft is monolithically formed with the divider panel, the spindle shaft extending from the spindle shaft location.

7. The enclosure of claim 1, wherein the at least one of the one or more strengthening members comprise one or more lateral members extending from the divider panel.

8. The enclosure of claim 7, wherein at least one of the one or more the strengthening members include one or more cross-members extending between the one or more lateral members.

9. The enclosure of claim 1, wherein the one or more strengthening members include a recess.

10. The enclosure of claim 1, wherein a side panel is operably secured to cover each of the opposing side openings.

11. The enclosure of claim 1, wherein the welding wire feeder enclosure is a combination wire feeder/welder enclosure.

12. The enclosure of claim 1, wherein the one or more strengthening members extend a distance along at least a portion of a height of the divider panel.

13. A welding wire feeder enclosure comprising:
   a front, a rear, a top, and a bottom forming a perimeter of the enclosure;
   a first opening opposite a second opening, the first and second openings separated by a width of the enclosure, and are each adapted for receiving a side wall;
   a divider wall extending substantially between the front, rear, top, and bottom, and positioned along an intermediate portion of the width of the enclosure to divide an internal volume of the enclosure into a first side and a second side, the first side having an integral spindle shaft location extending outwardly from the divider panel towards the first opening, and the second side having one or more integral strengthening members extending outwardly from the divider panel towards the second opening.

14. The enclosure of claim 13, wherein the one or more integral strengthening members are positioned relative to the spindle shaft location.

15. The enclosure of claim 13, wherein the one or more strengthening members vertically extends along at least a portion of the divider panel.

16. The enclosure of claim 13, where the one or more strengthening members extend a partial width of one of the second side of the enclosure.

17. The enclosure of claim 13, wherein the one or more strengthening members are monolithically formed with the divider wall.

18. The enclosure of claim 13, further comprising an integral spindle extending from the spindle shaft location.

19. The enclosure of claim 18, wherein a spindle shaft is monolithically formed with the divider wall, the spindle shaft extending from the spindle shaft location.

20. The enclosure of claim 13, wherein the at least one of the one or more strengthening members comprise one or more lateral members extending from the divider wall.

* * * * *